US012609820B2

(12) United States Patent
Tranier et al.

(10) Patent No.: US 12,609,820 B2
(45) Date of Patent: Apr. 21, 2026

(54) SYSTEM AND METHOD FOR GENERATING A SECURE SECRET KEY

(71) Applicant: THALES, Meudon (FR)

(72) Inventors: Benoit Tranier, Toulouse (FR); Jean Didier Gayrard, Toulouse (FR)

(73) Assignee: THALES, Meudon (FR)

( * ) Notice: Subject to any disclaimer, the term of this patent is extended or adjusted under 35 U.S.C. 154(b) by 164 days.

(21) Appl. No.: 18/693,934

(22) PCT Filed: Sep. 15, 2022

(86) PCT No.: PCT/EP2022/075602

§ 371 (c)(1),
(2) Date: Mar. 20, 2024

(87) PCT Pub. No.: WO2023/046557

PCT Pub. Date: Mar. 30, 2023

(65) Prior Publication Data

US 2024/0388430 A1    Nov. 21, 2024

(30) Foreign Application Priority Data

Sep. 23, 2021    (FR) ...................................... 2110024

(51) Int. Cl.
*H04L 29/06* (2006.01)
*H04L 9/08* (2006.01)
*H04L 9/14* (2006.01)

(52) U.S. Cl.
CPC .......... *H04L 9/0869* (2013.01); *H04L 9/0822* (2013.01); *H04L 9/0852* (2013.01); *H04L 9/14* (2013.01)

(58) Field of Classification Search
CPC ..... H04L 9/0822; H04L 9/0869; H04L 63/20; H04L 63/06; H04L 9/0852; H04L 9/14
See application file for complete search history.

(56) References Cited

U.S. PATENT DOCUMENTS 7,073,073 B1 * 7/2006 Nonaka ................. H04L 9/3247
380/278
11,411,722 B2 * 8/2022 Walenta ................ H04L 9/0894
2020/0351087 A1   11/2020 Mccandlish et al.

FOREIGN PATENT DOCUMENTS

WO      WO-2021090026 A1 * 5/2021   ............. H04B 10/70

OTHER PUBLICATIONS

Cui, et al., "A new scheme for quantum key distribution in free-space", 2009 15th Asia-Pacific Conference on Communications, pp. 637-640, 2009.

(Continued)

*Primary Examiner* — Longbit Chai
(74) *Attorney, Agent, or Firm* — Baker Hostetler

(57)                ABSTRACT

A method for generating a secure secret key, includes the following steps: A. receiving, in a communication station referred to as the transmitting station, a first secret key by way of a quantum encryption channel via satellite, the first secret key also being transmitted to at least one other communication station by way of the quantum encryption channel; B. generating, in the transmitting station, a second secret key using a trusted random number generator; C. generating an encrypted secret key using the first secret key and the second secret key by the one-time pad method; D. transmitting the encrypted secret key from the transmitting station to the one or more other communication stations.

13 Claims, 11 Drawing Sheets

(56)              References Cited

OTHER PUBLICATIONS

Menezes, et al., "Chapter 12: Key Establishment Protocols ED", Handbook of Applied Cryptography; [CRC Press Series on Discrete Mathematices and Its Applications], pp. 489-541, 1996. http://www.cacr.math.uwaterloo.ca/hac/.

* cited by examiner

A    Receive the key KEK over channel $CQ_{AB}$ via satellite Sat

B    Generate the key KS

C    Generate the key KC = KEK $\oplus$ KS

D    Transmit the key KC to station SB station SA

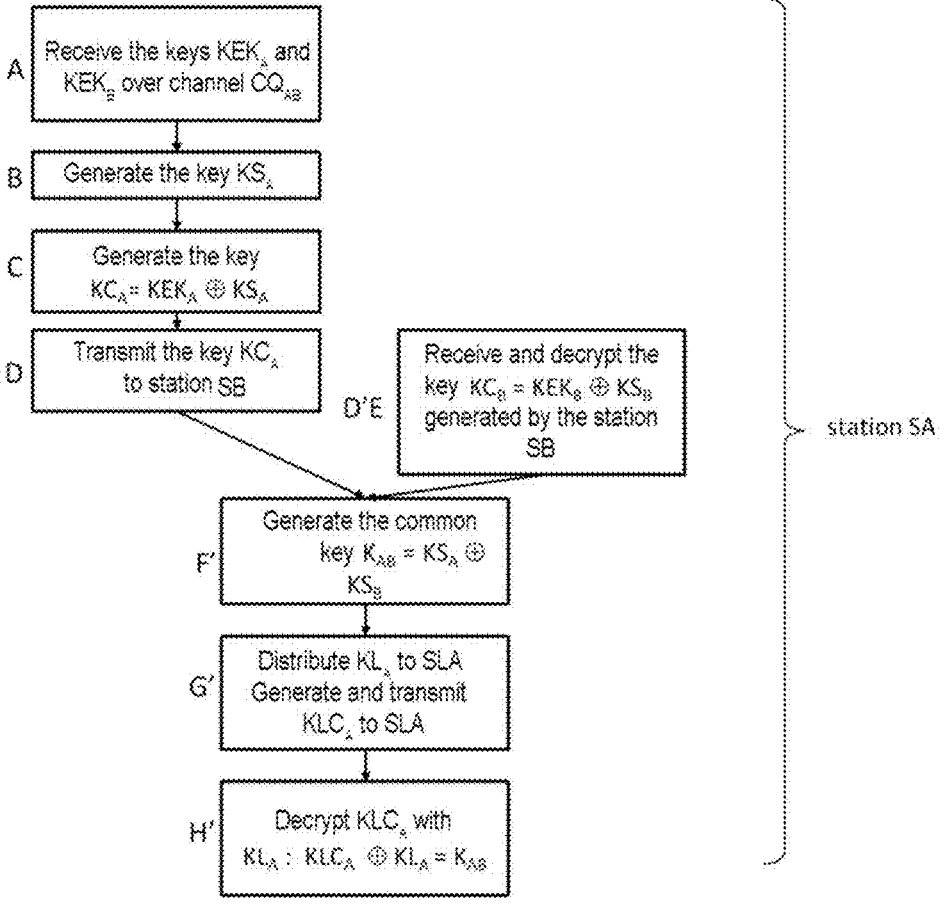

A    Receive the keys $KEK_A$ and $KEK_B$ over channel $CQ_{AB}$

B    Generate the key $KS_A$

C    Generate the key $KC_A = KEK_A \oplus KS_A$

D    Transmit the key $KC_A$ to station SB

D'E    Receive and decrypt the key $KC_B = KEK_B \oplus KS_B$ generated by the station SB F'    Generate the common key $K_{AB} = KS_A \oplus KS_B$ G'    Distribute $KL_A$ to SLA Generate and transmit $KLC_A$ to SLA H'    Decrypt $KLC_A$ with $KL_A : KLC_A \oplus KL_A = K_{AB}$ station SA

Fig.5B

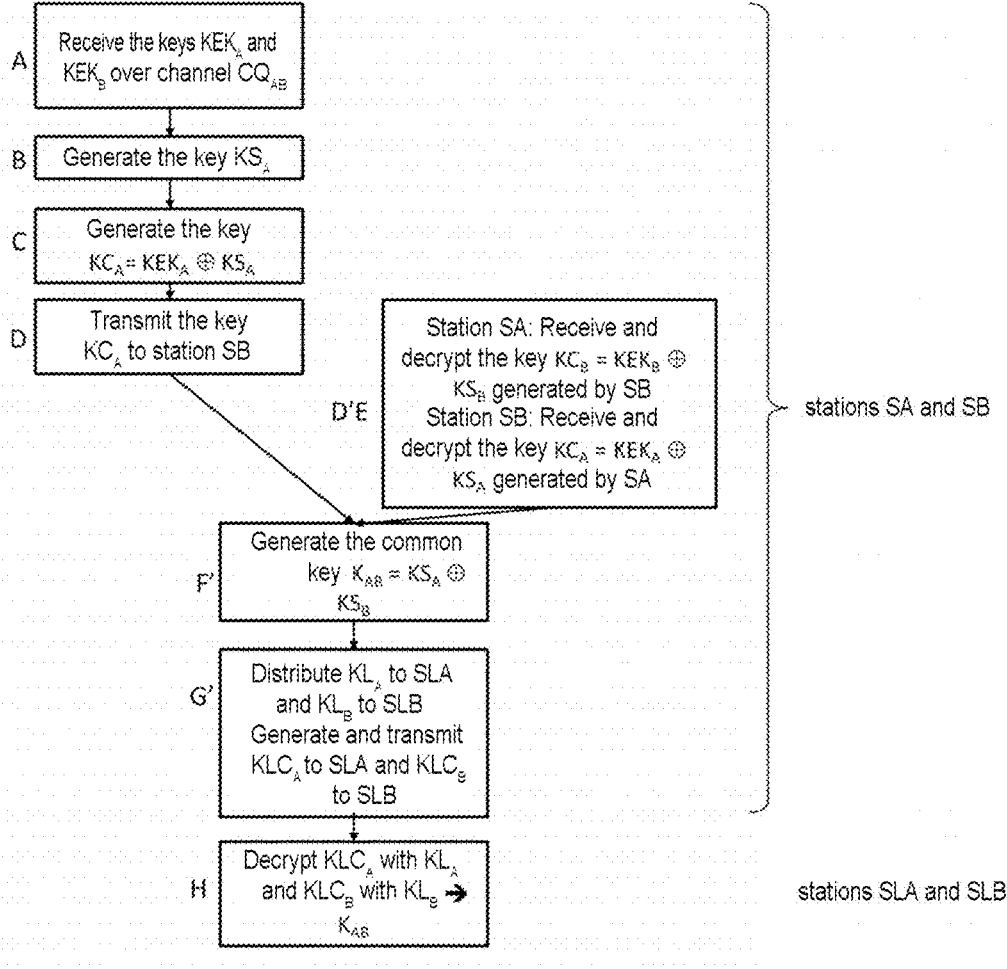

A — Receive the keys $KEK_A$ and $KEK_B$ over channel $CQ_{AB}$

B — Generate the key $KS_A$

C — Generate the key $KC_A = KEK_A \oplus KS_A$

D — Transmit the key $KC_A$ to station SB

D'E — Station SA: Receive and decrypt the key $KC_B = KEK_B \oplus KS_B$ generated by SB
Station SB: Receive and decrypt the key $KC_A = KEK_A \oplus KS_A$ generated by SA stations SA and SB F' — Generate the common key $K_{AB} = KS_A \oplus KS_B$ G' — Distribute $KL_A$ to SLA and $KL_B$ to SLB
Generate and transmit $KLC_A$ to SLA and $KLC_B$ to SLB H — Decrypt $KLC_A$ with $KL_A$ and $KLC_B$ with $KL_B \rightarrow K_{AB}$ stations SLA and SLB

Fig.5C

SYSTEM AND METHOD FOR GENERATING A SECURE SECRET KEY

CROSS-REFERENCE TO RELATED APPLICATIONS

This application is a National Stage of International patent application PCT/EP2022/075602, filed on Sep. 15, 2022, which claims priority to foreign French patent application No. FR 2110024, filed on Sep. 23, 2021, the disclosures of which are incorporated by reference in their entireties.

FIELD OF THE INVENTION

The present invention relates to the field of information-technology security and more particularly to the field of key distribution by satellites over quantum channels.

BACKGROUND

There has always been a need to exchange, over a public communication channel, sensitive information that must remain secret. Suppose that two people, Alice and Bob, wish to exchange, over an authenticated public communication channel (the internet for example), sensitive information shielded from prying eyes. To do this they must encrypt their messages. Let the person who wishes to intercept these messages be called Eve. Alice must, using a published cryptographic function (i.e. one that is not secret) and a secret key, encrypt her messages before sending them to Bob over a public channel. When Bob receives the encrypted messages, he must, using the same cryptographic function and secret key as Alice, decrypt them in order to be able to access the information in the clear.

Now the problem is the secret key shared between Alice and Bob: how is it generated, how is it exchanged securely and shielded from prying eyes?

During secure exchanges over the internet, a shared secret key is established using techniques based on public-key cryptography that will not be described in detail here. A new solution was devised at the end of the twentieth century. It proposes to use a quantum channel allowing Alice and Bob to establish a common secret key by exchanging quantum particles (e.g. photons) without Eve being able to determine the key. Nevertheless, this QKD technique (QKD standing for Quantum Key Distribution) suffers from a few limitations that make it difficult to apply to a high number of users and over very long distances. This could, in time, make this technique unattractive and therefore not profitable enough to generate industrial opportunities.

FIG. 1 schematically shows the architecture of a quantum channel allowing two users, Alice (the sender of the code) and Bob (the receiver of the code), to establish a common secret key. The key is a sequence of random bits, which may therefore take the value 0 or 1. To transmit this key, Alice encodes each bit of the key in one of two polarization modes of a photon prepared by Alice, selection of the polarization mode being random. Alice notes for each bit (and therefore each photon) the randomly selected polarization mode. Using a polarizing filter and a photon detector able to be alternately oriented in the two randomly chosen polarization modes, Bob notes the detection result (the photon passed the filter, or the photon did not pass the filter) and the selected orientation of the filter.

Once the entire sequence of qubits has been transmitted, Alice sends Bob the polarization modes used for each qubit over an authenticated clear channel. Bob can then deduce the value of the bits for which the polarization orientation was the same. He then knows with certainty N bits on average for 2N bits transmitted by Alice, this sequence being called the reconciled key.

Lastly, Alice and Bob agree on a subset of the reconciled key. They then compare whether they have obtained the same bits in this subset: if so, they use the rest of the key to derive a cryptographic key. If there is a disagreement, the process is restarted. Specifically, the no-cloning theorem guarantees that if Eve were to eavesdrop, she would force the photon into a polarization mode (one that is not necessarily Alice's). Hence, were Eve to correctly guess Alice's mode with a probability of 50%, then 25% of the bits in the reconciliation key would not match. Generally, by sacrificing n bits of the reconciliation key, Alice and Bob can detect a potential spy on the channel with a probability of $$1 - \left(\frac{3}{4}\right)^n.$$

In terrestrial networks, key exchange (or more precisely: key establishment) over a quantum channel is easy to achieve, as an optical communication channel set up via an optical fiber may be used. Nevertheless, Alice and Bob cannot exchange single polarized photons (or light pulses of very low intensity) through a fiber when they are more than 100 km apart, 100 km being the asymptote of the probability of 100% absorption of photons by the material from which the optical fiber is made.

Therefore, the architecture of quantum-channel networks is severely impacted by this physical constraint. Two solutions have been devised to overcome this limit of 100 km.

The first envisioned solution is to propagate the keys through so-called "trusted nodes" placed at regular intervals (every 100 kilometers for example). FIG. 2A schematically illustrates a prior-art device allowing a trusted node to generate a key. The trusted node manipulates in the clear the key established with Alice (key A) and the key established with Bob (key B). This trusted node is positioned equidistant between Alice and Bob, and allows the range of quantum-channel key establishment to be extended to 200 km. Next, the trusted node employs the one-time-pad technique to transmit key A to Bob. To do this, the trusted node applies an XOR (exclusive-OR logic gate) to Alice's key and Bob's key. By "XOR", what is meant here and in the remainder of the document is combination of two keys by means of an "exclusive or" or "XOR" logic gate, of symbol $\oplus$. The result is transmitted to Bob over an authenticated clear channel. Bob, who holds key B, will be able to perform an XOR between the sequence received from node No. 2 and his key (key B) to recover Alice's key (key A).

This first solution is based on the following property of the XOR function: $A \oplus B \oplus B = A \oplus (B \oplus B)_{=0} = A$ but also on use of the one-time-pad (OTP) technique, which guarantees that it is not possible to determine key A and/or key B knowing only the sequence key $A \oplus$ key B. The one-time-pad technique is based on the following principle. Any message that must be encrypted is encrypted using a strictly random key of same size as the message, which key will be combined with the plaintext message to obtain the encrypted message. Decryption will be achieved by performing the reverse operation on the encrypted message using the same secret key. This technique has been proved to be theoretically unbreakable by Claude Shannon, regardless of the means available to the attacker, provided that the following three absolutely fundamental rules are respected:

the key must be as long as the message to be encrypted, the key must be strictly random, i.e. the constituent elements (bits or characters) of the key must all be independent of one another, each key (or mask) must be used only once to encrypt a single message.

Nevertheless, this first solution requires the trusted nodes, which manipulate the keys in the clear, to be secured to a very high level of security, which implies non-negligible operational constraints and additional costs. Furthermore, this type of solution is difficult, if not impossible, to implement to interconnect two users separated by an ocean (it would be difficult and expensive to implement trusted nodes every 100 km under an ocean).

The second solution is free-field exchange of photons, and therefore exchange of photons from space. In this case, the 100 kilometer optical-fiber limit is no longer applicable and encryption keys can be distributed from space to two users located anywhere on Earth over QKD channels. This configuration is illustrated in FIG. 2B. In this case, it is the satellite that acts as a trusted node since it will establish a key A with Alice and a key B with Bob and then transmit to Bob key $A \oplus$ key B over a conventional authenticated plaintext communication channel. On the ground, Bob, who has in his possession key B, will be able to extract Alice's key A by performing an XOR of key B with the sequence key $A \oplus$ key B that the satellite sent. Here, the satellite, if it is in low orbit, will be moving relative to Alice and relative to Bob. Hence, whatever the distance separating Alice and Bob, the satellite acts as a mobile trusted node capable of establishing key A and key B and distributing the combination key $A \oplus$ key B allowing Alice and Bob to share a common secret key (key A).

The technique of quantum key distribution from space nevertheless suffers from a few major flaws, namely:

the unavailability of optical channels in case of bad weather (presence of clouds or even air pollution: aerosols), the low key bit rates obtained, which are at best a few kilobits per second (satellite in low orbit with a prepare-and-measure protocol), the need to store, in advance of the time when they will actually be required by users, keys established over a fairly long period of time (a few months), the keys are stored in the ground access points used to interface with the satellites.

These flaws make it impossible to envision this type of infrastructure being employed by a very high number of users on the ground (<1000). At the present time, it is only envisioned to use QKD from space to secure exchanges between state entities and systems of vital interest, such as energy infrastructure for example.

SUMMARY OF THE INVENTION

The invention aims to overcome certain problems of the prior art. To this end, one subject of the invention is a system and method for generating a secure secret key using the one-time-pad (OTP) technique to allow a higher number of secure secret keys to be generated and distributed to users on the ground. In the invention, the secure secret keys are generated from a first secret key initially established by QKD, via a satellite orbiting the Earth. Thus, a single first secret key obtained by QKD is required to generate a plurality of secure secret keys. Since both techniques, QKD and OTP, are resistant to the quantum threat, the method of the invention allows the availability of a global QKD system to a high number of interconnected users on the ground to be increased while guaranteeing security against the threat of quantum computers.

To this end, one subject of the invention is a method for generating a secure secret key comprising the following steps:

A. receiving, in a communication station called the sending station, a first secret key over a quantum encryption channel set up with a satellite, said first secret key also being transmitted to at least one other communication station via said quantum encryption channel;

B. generating, in said sending station, a second secret key using a true random number generator;

C. generating an encrypted secret key from the first secret key and second secret key by means of the one-time-pad method;

D. transmitting said encrypted secret key from the sending station to the one or more other communication stations.

According to one preferred embodiment, the method of the invention comprises a step E, subsequent to step D, of decrypting, in the one or more other communication stations, said encrypted secret key using the first secret key, so as to obtain said second secret key, which forms said secure secret key.

Preferably, in this preferred embodiment, the first secret key, the second secret key and the encrypted secret key are binary encoded, the encrypted secret key being generated via an XOR logic gate that combines the first secret key and second secret key, the encrypted secret key being decrypted via an XOR logic gate that combines the encrypted secret key and the first secret key.

Preferably, in this preferred embodiment, steps B to E are repeated a plurality of times, in order to form a plurality of secure secret keys, all generated from the first secret key.

Preferably, in this preferred embodiment, the method of the invention comprises a subsequent step F of encrypting a non-random message using said or a said secure secret key then transmitting the encrypted non-random message from one communication station to another communication station, and comprising a subsequent step G of decrypting said encrypted non-random message using said secure secret key.

According to one preferred embodiment, step A is repeated twice before step B, in order to receive, in a first communication station, a first secret key A and a first secret key B that is different from the first secret key A, the first key and second key also being transmitted to a second communication station, via said quantum channel, and steps B to D are carried out by the first communication station to generate a first encrypted secret key from the first secret key A and from a second secure secret key A generated by the first communication station, and to transmit it to said second communication station, said method comprising additional steps D'E, F', G' and H carried out by said first communication station, said step D'E consisting in:

receiving a second encrypted secret key generated by the second communication station from the first secret key B and from a second secure secret key B generated by the second communication station, and decrypting said second encrypted secret key with the first secret key B so as to obtain said second secure secret key B, said step F' consisting in generating a secret key called the common secret key, by means of the one-time-pad technique, from the second secure secret key A and from the second secure secret key B, said step G' consisting in:

distributing a secret key called the first local secret key to a first local communication station, via a first local quantum channel, generating, by means of the one-time-pad method, a first encrypted local secret key from the first local secret key and from the common secret key, and transmitting said first encrypted local secret key to said first local communication station, said step H consisting in decrypting, in said first local communication station, said first encrypted local secret key using the first local secret key, so as to obtain said common secret key.

Preferably, in this preferred embodiment, step D'E comprises decrypting, in the second communication station, said first encrypted secret key with the first secret key A so as to obtain said second secure secret key A, and step F' comprises generating, in the second communication station, said common secret key, by means of the one-time-pad technique, from the second secure secret key A and from the second secure secret key B, said method comprising a step G', which comprises:

distributing a second local secret key to a second local communication station, via a second local quantum channel, generating, by means of the one-time-pad method, a second encrypted local secret key from the second local secret key and from the common secret key, and transmitting said second encrypted local secret key to said second local communication station, and said step H comprises decrypting, in the second local communication station, said second encrypted local secret key using the second local secret key, so as to obtain said common secret key.

Preferably, the method comprises a step I, subsequent to step H, and performed by the first local communication station, of encrypting a non-random message using said common secret key then transmitting the encrypted non-random message to the second local communication station, said method comprising a step J, subsequent to step I, and performed by the second local communication station, of decrypting said encrypted non-random message using said common secret key.

Preferably, the first secret key and the second secret key are of the same size.

Preferably, the non-random message is encrypted by means of a symmetric encryption method, for example block or stream encryption.

Another subject of the invention is a communication station, called the first communication station, for generating a secure secret key, said first communication station being configured to receive a first secret key over a quantum encryption channel set up with a satellite, said first secret key also being transmitted to at least one other communication station via said quantum encryption channel, said first communication station comprising an encrypting module configured to:

generate a second secret key using a true random number generator;

generate an encrypted secret key from the first secret key and second secret key by means of the one-time-pad method;

transmit said encrypted secret key to said other communication stations.

Another subject of the invention is a system comprising the first communication station, and comprising said other communication stations and said satellite, said other communication stations being configured to decrypt said encrypted secret key using the first secret key, so as to obtain said second secret key, which forms said secure secret key.

Another subject of the invention is an assembly for generating a secure secret key, said assembly comprising said first communication station and comprising a first local communication station, said first communication station being configured to:

receive a first secret key A and a first secret key B that is different from the first secret key A via said quantum encryption channel, the first key and the second key also being transmitted to a second communication station via said quantum channel, generate a first encrypted secret key from the first secret key A and from a second secure secret key A generated by the first communication station, and to transmit it to said second communication station, receive a second encrypted secret key generated by the second communication station from the first secret key B and from a second secure secret key B generated by the second communication station, and decrypting said second encrypted secret key with the first secret key B so as to obtain said second secure secret key B, generate a secret key called the common secret key, by means of the one-time-pad technique, from the second secure secret key A and from the second secure secret key B, distribute a secret key called the first local secret key to said first local communication station, via a first local quantum channel, generate, by means of the one-time-pad method, a first encrypted local secret key from the first local secret key and from the common secret key, and transmit said first encrypted local secret key to said first local communication station, said first local communication station being configured to decrypt said first encrypted local secret key using the first local secret key, so as to obtain said common secret key.

Another subject of the invention is a system comprising the assembly, the satellite, a second local communication station, and comprising a second communication station comprising an encrypting module, the second communication station being configured to:

decrypt, in the second communication station, said first encrypted secret key with the first secret key A so as to obtain said second secure secret key A, generate a secret key called the common secret key, by means of the one-time-pad technique, from the second secure secret key A and from the second secure secret key B, generate, in the second communication station, said common secret key by means of the one-time-pad technique, from the second secure secret key A and from the second secure secret key B, distribute a second local secret key to the second local communication station, via a second local quantum channel, generate, by means of the one-time-pad method, a second encrypted local secret key from the second local secret key and from the common secret key, and transmit said second encrypted local secret key to said second local communication station, the second local communication station being configured to decrypt said second encrypted local secret key using the second local secret key, so as to obtain said common secret key.

Preferably, in the system, the communication stations are on the ground and spaced apart by more than 100 km.

Other features, details and advantages of the invention will become apparent on reading the description given with reference to the appended drawings, which are given by way of example and which show, respectively:

BRIEF DESCRIPTION OF THE FIGURES

Other features, details and advantages of the invention will become apparent on reading the description given with reference to the appended drawings, which are given by way of example and which show, respectively.

DETAILED DESCRIPTION

Figure 3A:
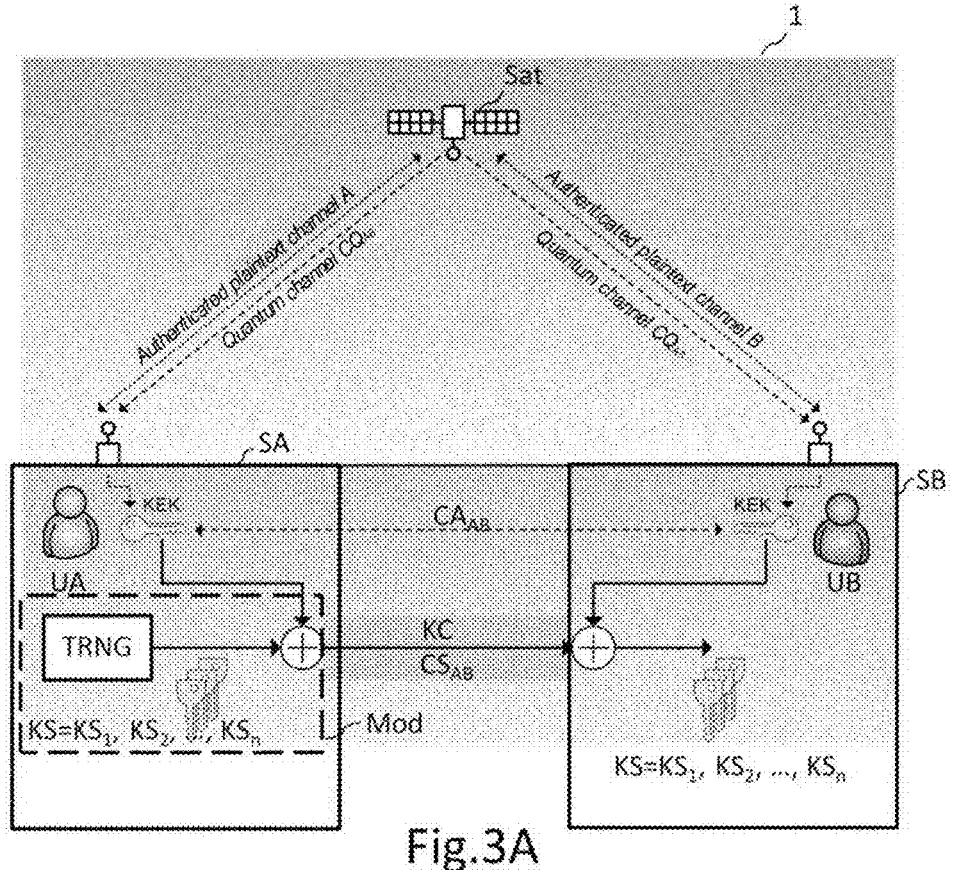

FIG. 3A illustrates a schematic view of a system 1 for generating a secure secret key according to the invention comprising at least two communication stations SA, SB and a satellite Sat. By way of non-limiting example, FIG. 3A illustrates an embodiment in which the system 1 comprises a first communication station SA and a second communication station SB. Alternatively, according to another embodiment, the system of the invention comprises more than two communication stations.

Figure 3B:
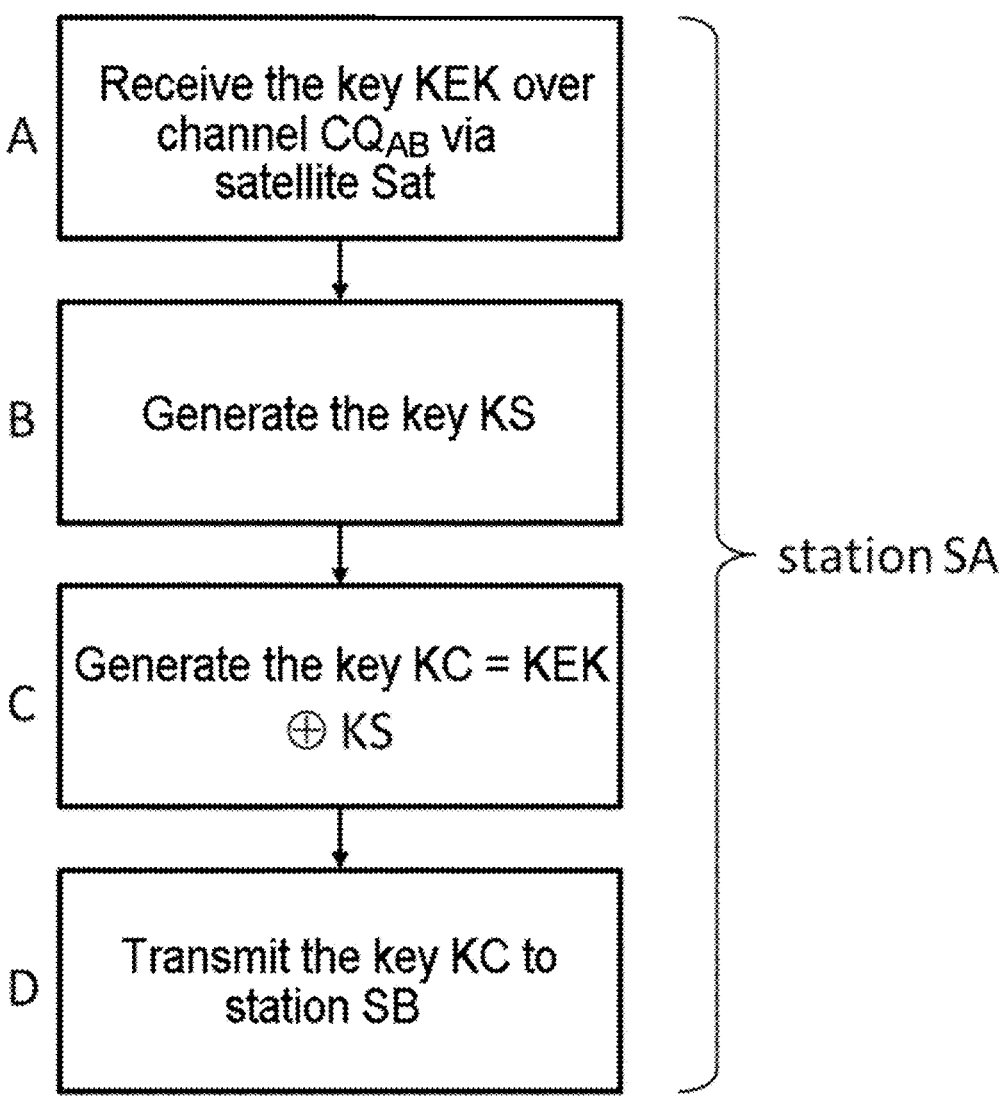

FIG. 3B schematically illustrates a method for generating a secure secret key according to the invention, implemented by the first communication station SA of the system 1.

Figure 1:
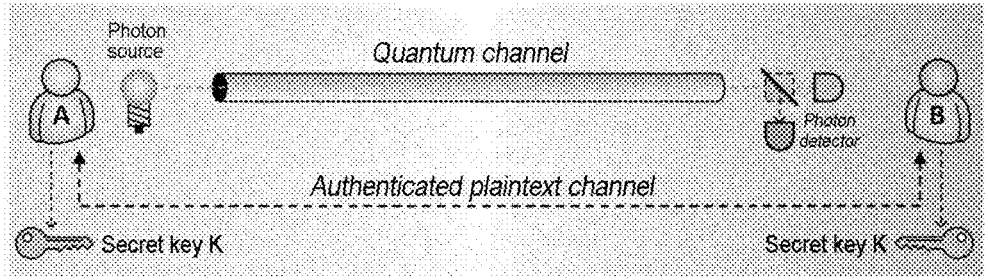
FIG. 1, a schematic view of a QKD device according to the prior art.
Figure 2A:
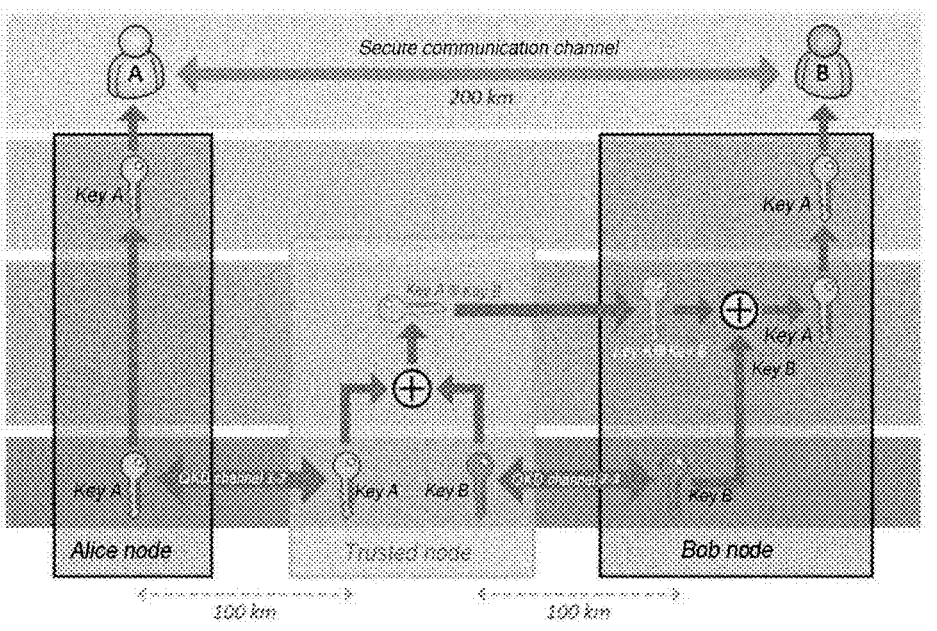
FIG. 2A, a schematic view of a prior-art satellite-based device for generating a key through QKD, FIG. 2B, a schematic view of a prior-art device allowing a trusted node to generate a key, FIG. 3A, a schematic view of a system for generating a secure secret key according to the invention, FIG. 3B, a schematic view of a method for generating a secure secret key according to the invention, FIG. 3C, a schematic view of a method for generating a secure secret key according to a preferred embodiment of the method of the invention, FIG. 4A, a schematic view of a system for generating a secure secret key according to one embodiment of the invention, FIG. 4B, a schematic view of a method for generating a secure secret key according to a preferred embodiment of the method of the invention, FIG. 5A, a schematic view of a system for generating a secure secret key according to one embodiment of the invention, FIG. 5B, a schematic view of a method for generating a secure secret key according to the invention, FIG. 5C, a schematic view of one preferred embodiment of the method of FIG. 5B, FIG. 6A, a schematic view of a system according to one embodiment of the invention, FIG. 6B, a schematic view of a method for generating a secure secret key according to the invention, In the figures, unless otherwise indicated, elements have not been drawn to scale.
Figure 2B:
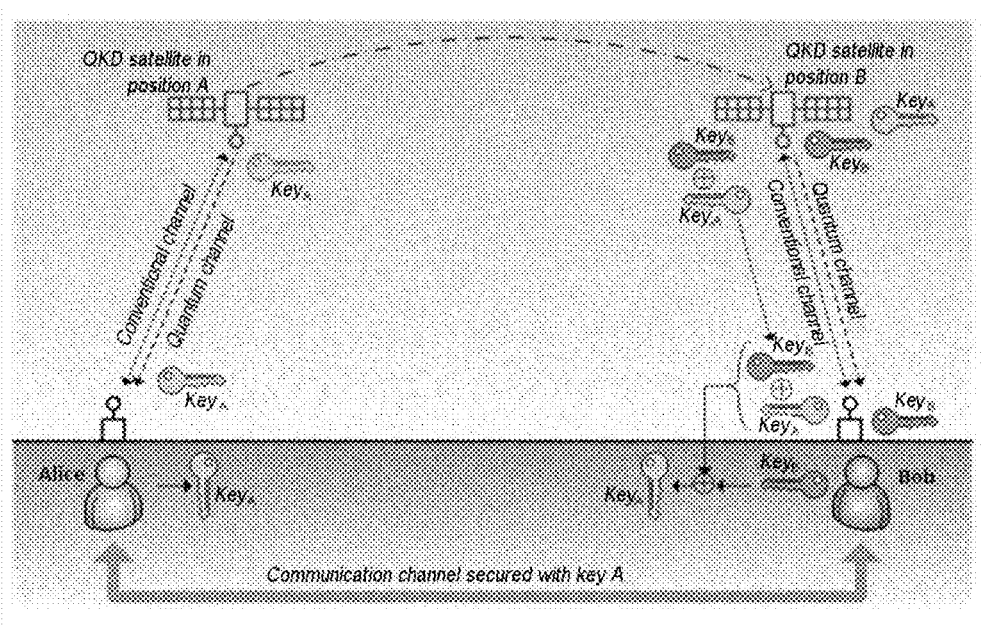

In a first step A of the method of the invention, the communication station SA is configured to receive a first secret key KEK from the satellite Sat over a quantum encryption channel $CQ_{AB}$. This first secret key KEK is also transmitted to at least one other communication station SB—i.e. the station SB in the system illustrated in FIG. 3A—over the quantum encryption channel $CQ_{AB}$. This step is known to those skilled in the art and consists of conventional QKD by a satellite (see FIG. 2B). In the system of the invention, the satellite Sat acts as a trusted node connecting the station SA to the station SB, and the stations SA and SB may therefore be spaced apart by a distance greater than 100 km, which is the limit of a QKD channel employing an optical fiber.

In a step B of the method of the invention, the first communication station SA is configured to generate a second secret key KS using a true random number generator TRNG. This type of generator TRNG is known to those skilled in the art. For example, this generator may be a quantum random number generator (QRNG). In this case, the random numbers are produced on the basis of unpredictable quantum phenomena.

In a step C, the first communication station SA generates an encrypted secret key KC from the first secret key KEK and from the second secret key KS by means of the one-time-pad (OTP) method. In order to ensure the security of the one-time-pad technique, in the invention, the first secret key and the second secret key are of the same size (i.e. they have the same key size). More generally, in the remainder of the description, all the steps implementing the one-time-pad technique combine two keys that are of the same size.

The method of FIG. 3B comprises a last step D of transmitting the encrypted secret key KC from the first communication station SA to the other communication stations, i.e. station SB in the embodiment of FIG. 3A. This transmission is carried out over a secure and authenticated channel $CS_{AB}$ linking the stations SA and SB.

Steps B to D are performed by the module Mod of the first communication station SA.

The second secret key KS forms the secure secret key. Specifically, at the end of the method of FIG. 3B, a user UB of the station SB is able to decrypt the encrypted secret key KC with the first secret key KEK that was distributed by the satellite Sat via QKD, so as to obtain the second secret key KS (see the method of FIG. 3C). Now, step B of the method of the invention (i.e. generation of the second secret key) can be easily repeated and does not suffer from the limitations of key generation by QKD via satellite (low bit rate, sensitivity to bad weather, etc.). Thus, in the invention, a single first secret key KEK obtained by QKD allows a plurality of secure secret keys to be generated via the one-time-pad method by combining these secure secret keys with the first secret key KEK. The key KEK is here a cryptographic primitive that allows the second secure secret keys to be exchanged securely. The method of the invention thus allows the number of secret keys to be distributed by QKD via satellite to be considerably decreased, providing an elegant solution to the problem posed by the low key rates achievable with this technique. Since the techniques implemented in the method of the invention (QKD and OTP) are resistant to the quantum threat, the method of the invention allows the availability of a global QKD system to a high number of interconnected users on the ground to be increased. In the invention, it is however important not to reuse the key KEK to encrypt non-random messages that it is desired to exchange between the stations SA and SB (see below). In the method of the invention, the second secure secret keys KS are in fact random "messages", and hence reuse of the same key runs no risk.

The following example illustrates why the method of the invention is secure. A user UA of the station SA is assumed to have produced two second keys KS1 and KS2, which he decides to encrypt with the same key KEK in order to transfer them to UB, the user of the station SB. These keys are assumed to be encoded in binary. The step of encrypting the encrypted secret key therefore consists in an XOR of the first and second secret keys.

The secret key encrypted using KS1 is denoted KC1: KC1=KEK⊕KS1.

The secret key encrypted using KS2 is denoted KC2: KC2=KEK⊕KS2.

Eve, the spy, will intercept the two messages encrypted with the same key KEK distributed by QKD. What will she be able to extract information-wise?

Eve can XOR these two encrypted messages to remove the effect of the first secret key KEK:

$$KC1 \oplus KC2 = KEK \oplus KS1 \oplus KEK \oplus KS2,$$
$$KC1 \oplus KC2 = (KEK \oplus KEK)_{\_0} \oplus KS1 \oplus KS2,$$
$$KC1 \oplus KC2 = KS1 \oplus KS2.$$

Eve therefore has the following at her disposition:

$$KC1 = KEK \oplus KS1,$$
$$KC2 = KEK \oplus KS2,$$
$$KC1 \oplus KC2 \oplus KS1 \oplus KS2.$$

These 3 sequences represent the XOR between random messages that have no statistical prevalence with respect to any other random message.

The XOR between KC1 and KC2 indeed allows Eve to remove the influence of KEK. However, since KS1 and KS2 are also keys and therefore strictly random messages, it is impossible for Eve to conduct an attack through statistical analysis or even a brute-force attack simply because all the messages that she would obtain would potentially be the right ones. She has no information that allows her to determine the initial plaintext messages. On the contrary, based on such a combination KC1⊕KC2, Eve will obtain an infinite number (minus the size of the key) of pairs of probable plaintext messages which, with an equally probable first secret key KEK, will result in the two encrypted messages KC1 and KC2.

In the invention, the fact that the second secret keys are random messages (i.e. all equiprobable) therefore allows UA and UB to encrypt them using the same first secret key KEK without compromising the security of the encryption.

It will be noted that all the steps of the method of FIG. 3B are implemented by the first station SA and are therefore "localized" in the same geographical area, instead of being distributed over various stations spaced apart by several hundred or thousand kilometers.

Figure 3C:
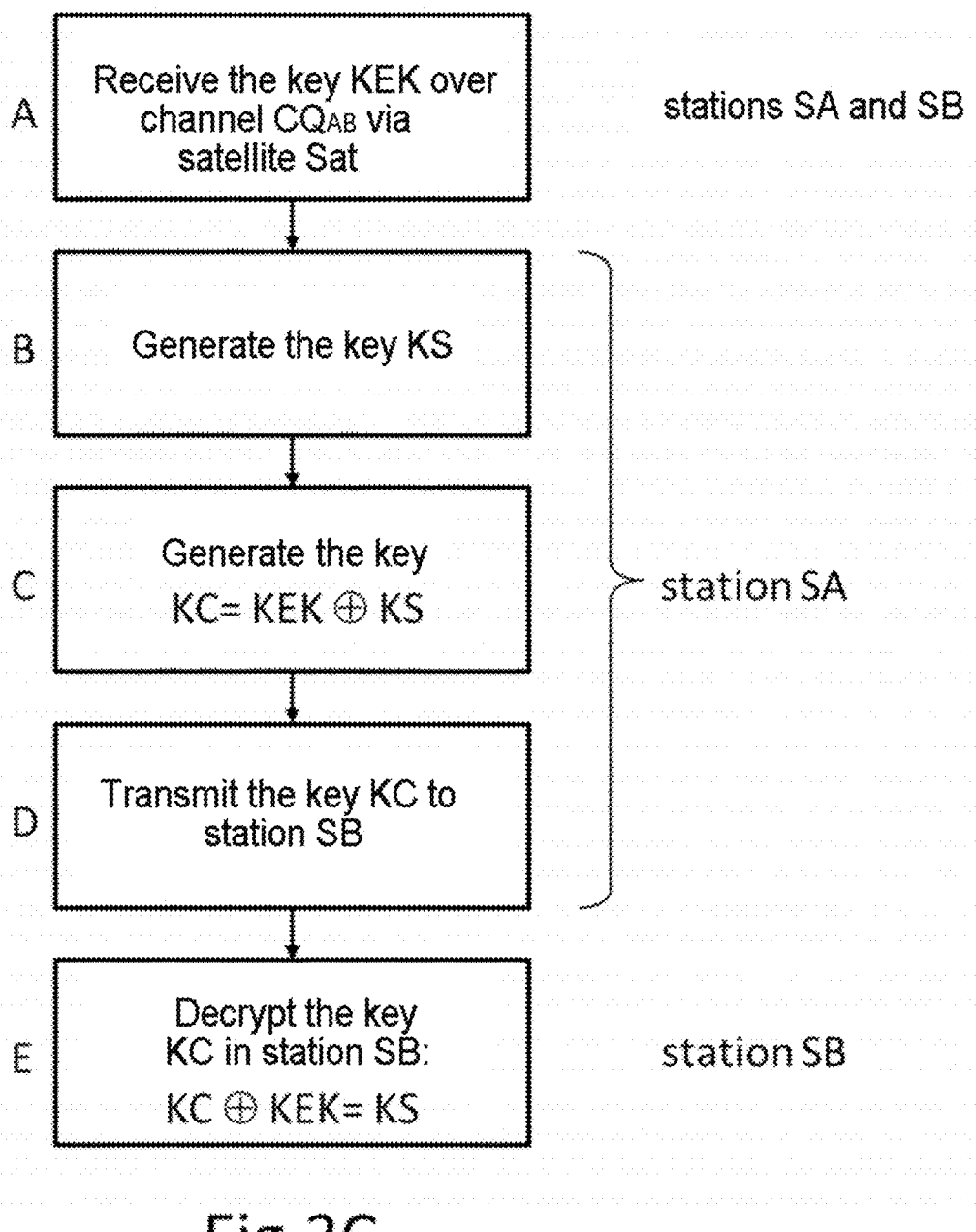

FIG. 3C illustrates one preferred embodiment of the method of the invention. This method is implemented by the system 1 of FIG. 3A, which also includes the satellite Sat and the station SB. The method of FIG. 3C comprises a step E, subsequent to step D and implemented by the communication stations to which the encrypted secret key KC was transmitted, i.e. station SB in the embodiment of FIG. 3A. This step E consists in decrypting the encrypted secret key KC using the first secret key KEK, so as to obtain the second secret key KS, which forms the secure secret key. This step is necessary as it allows the two stations SA and SB to obtain the secure secret key that they will subsequently use to encrypt non-random messages that they wish to exchange.

Preferably, in the method of the invention, the second secret key and the encrypted secret key are encoded in binary. In this embodiment, the encrypted secret key KC is generated by an XOR logic gate that combines the first secret key KEK and the second secret key KS. Step C is therefore KC=KS⊕KEK. In this embodiment, decrypting step E is carried out by the XOR logic gate, through combination of the encrypted secret key KC and the first secret key KEK. Step E is therefore: KC⊕KEK=KS⊕KEK⊕KEK=KS. In the remainder of the description, by way of non-limiting example, all the keys are considered to be encoded in binary, each step of OTP encryption is considered to consist of an XOR of the keys used for the encryption and each step of encrypting a key encrypted by OTP is considered to consist of an XOR of the key encrypted with one of the two keys used for OTP encryption.

As explained above, a single first secret key KEK is necessary to generate and exchange a plurality of second secure secret keys by means of the method of the invention. Thus, in one preferred embodiment of the method of FIG. 3C, steps B to E are repeated a plurality of times, in order to form a plurality of secure secret keys $KS_1, KS_2, \ldots, KS_n$, all generated from the first secret key KEK.

Figure 4A:
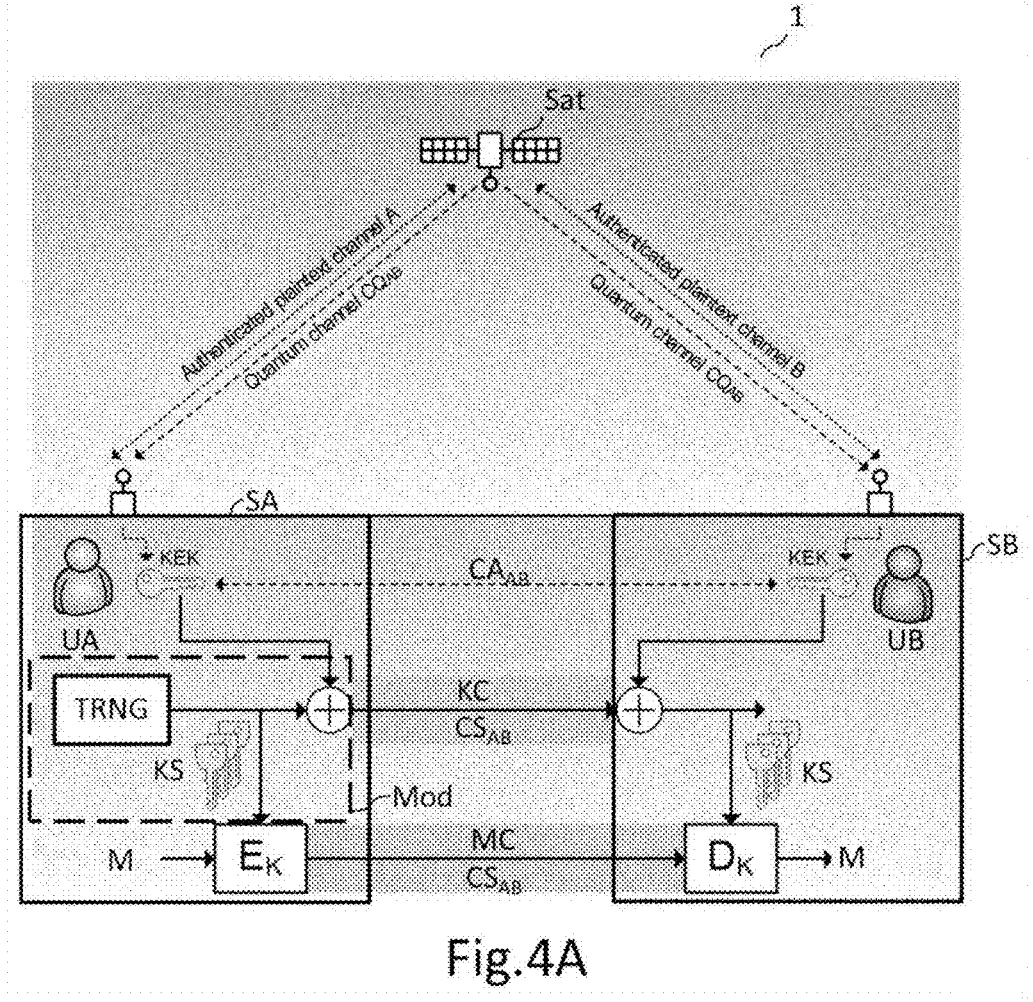
Figure 4B:
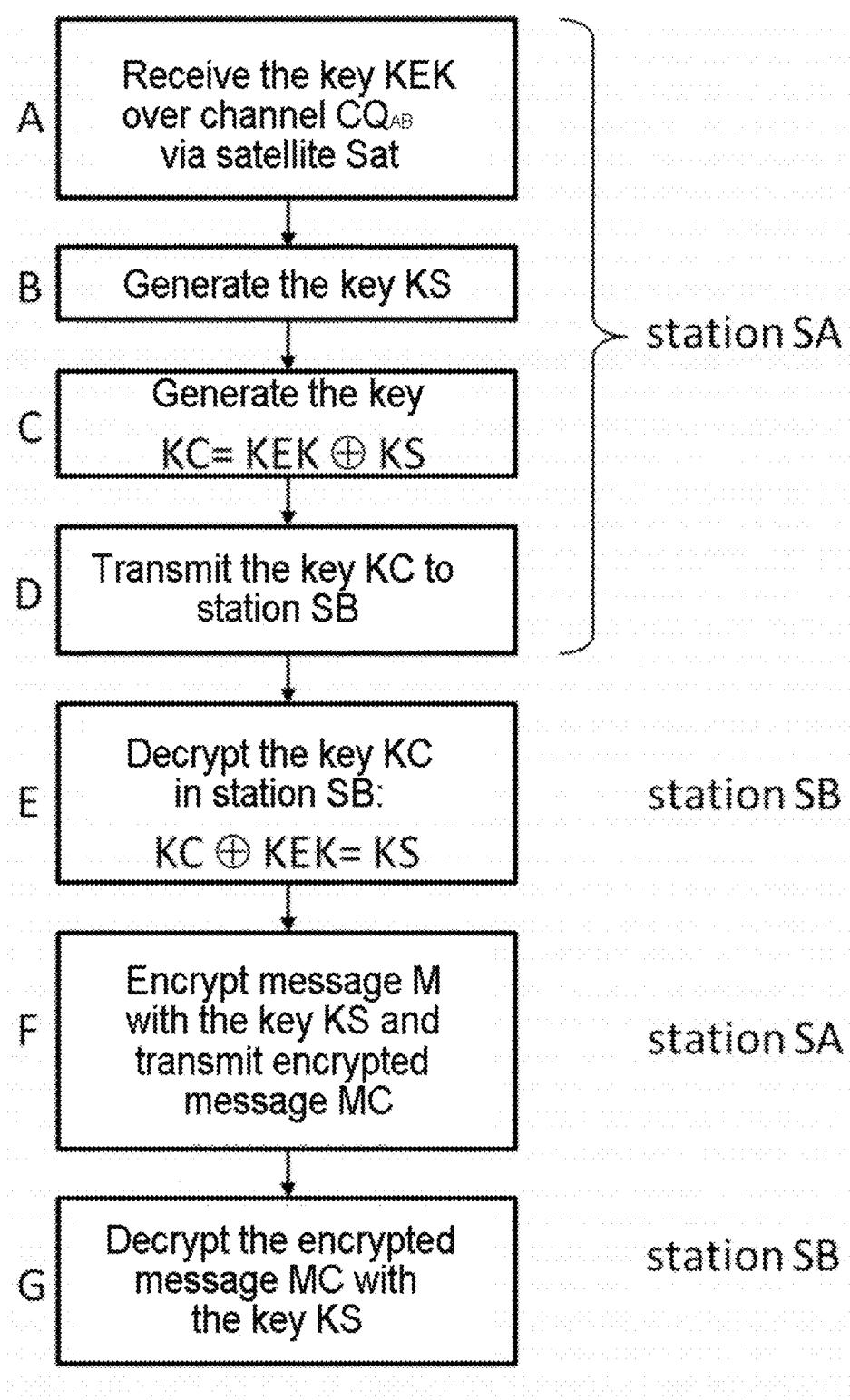

FIG. 4A illustrates one embodiment of the system 1 of the invention, configured to implement the method of FIG. 4B. This method is a preferred embodiment of the method of FIG. 3C and allows a non-random message M to be exchanged between the stations SA and SB. The method in FIG. 4B comprises two additional steps F and G. Step F, which is carried out in one of the communication stations, SA for example, consists in:

encrypting a non-random message M using a secure secret key KS generated by means of the method of the invention; and transmitting the encrypted non-random message MC from the communication station SA to another communication station SB. This message is preferably exchanged over a secure and authenticated channel linking the stations SA and SB, the channel $CS_{AB}$ for example.

Furthermore, the method of FIG. 3D comprises a last step G, consisting in decrypting the encrypted non-random message MC using the secure secret key KS. The method of FIG. 4B is the ultimate goal of the method of the invention. It allows a plurality of encrypted non-random messages $MC_1, MC_2, \ldots, MC_n$ to be exchanged using a plurality of secure secret keys $KS_1, KS_2, \ldots, KS_n$ all generated from the first secret key KEK.

In order not to compromise the confidentiality of the one or more non-random messages M exchanged in the method of FIG. 3D, it is necessary, in step F, for the non-random message to not be encrypted, using the one-time-pad method, with one of the secure secret keys KS generated by the method of the invention. Specifically, let it be assumed that UA carries out this encryption. UA therefore encrypts a first message M1 with a second secret key KS1 that was transmitted thereto encrypted in the form KEK⊕KS1, then encrypts a second message M2 with a second secret key KS2 that was also transmitted thereto, in the form KEK⊕KS2. In this case, Eve will still be able to intercept the encrypted messages and perform a few operations with a view to retrieving information:

The following encrypted message is denoted MC1: MC1=KS1⊕M1,

The following encrypted message is denoted MC2: MC2=KS2⊕M2,

Eve has at her disposal the encrypted secret keys KC1, KC2. She is able to combine the encrypted secret keys KC1, KC2 with MC1, MC2 to obtain:

---

KC1 ⊕ MC1 = KEK ⊕ KS1 ⊕ M1 ⊕ KS1 = KEK ⊕
M1 ⊕ (KS1 ⊕ KS1)$_{-0}$, = KEK ⊕ M1,
KC2 ⊕ MC1 = KEK$_A$ ⊕ KS1 ⊕ M2 ⊕ KS1 =
KEK ⊕ M2 ⊕ (KS1 ⊕ KS1)$_{-0}$, = KEK ⊕ M2.

---

Now Eve has the equivalent of two encrypted sequences that combine plaintext non-random messages with the same first secret key KEK. Eve can therefore "xor" these two sequences as follows:

---

(KC1 ⊕ MC1) ⊕ (KC2 ⊕ MC1) = KEK ⊕ M1 ⊕ KEK ⊕ M2 =
(KEK ⊕ KEK)$_{-0}$ ⊕ M1 ⊕ M2 = M1 ⊕ M2,

---

Eve has managed to remove the influence of the first secret key KEK, to obtain a sequence that represents the combination of two non-random messages (M1⊕M2). On the basis of this sequence, Eve will be able either to carry out a brute-force attack or a statistical analysis to extract therefrom the non-random messages M1 and M2, which will moreover allow her to determine the first secret key KEK.

Thus, to avoid destroying the security of the non-random message M, in the invention, the non-random message is encrypted by means of a symmetric encryption method, for example block or stream encryption.

Figure 5A:
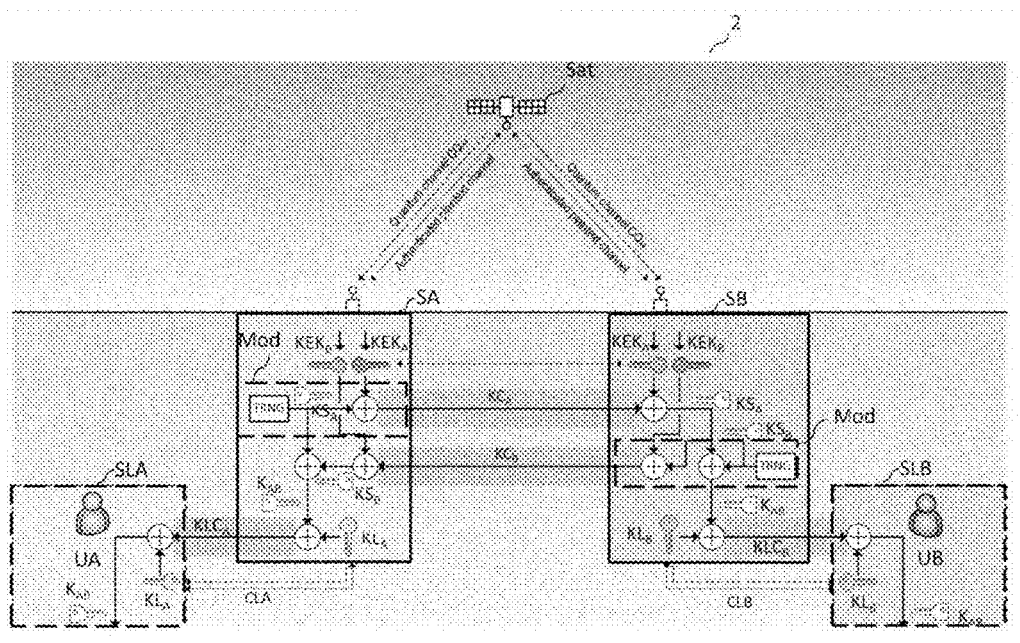

FIG. 5A illustrates a system 2 for generating a secure key that forms one particular embodiment of the device 1 of the invention, illustrated in FIG. 3A. In addition to the system 1, the system 2 comprises a first local communication station SLA and a second local communication station SLB. In the system 2, the stations SA and SB both comprise an encrypting module Mod. FIG. 5B schematically illustrates a method for generating a secure secret key according to the invention, implemented by the assembly SA+SLA of the system 2. As will be explained below, the method of FIG. 5B allows two users UA and UB, of the local station SLA and SLB respectively, to locally establish a common secret key K$_{AB}$ via the station SA or SB with which the local station SLA or SLB is respectively connected. The advantage of this system 2—and of the associated method—is that it allows the users UA and UB to avoid the need to manage the QKD distribution by the satellite Sat to the stations SA and SB. Thus, communication with the satellite takes place via gateway stations SA, SB, to which the end users UA and UB are connected by short-range quantum channels, which are fiber-based for example.

In the method of FIG. 5B, step A of the method of the invention is repeated twice before step B, in order to receive, in the first communication station SA, a first secret key A, denoted KEK$_A$, and a first secret key B, denoted KEK$_B$, that is different from the first secret key A. As specified in the description of the method of the invention, these first secret keys KEK$_A$ and KEK$_B$ are distributed by QKD via the satellite Sat over the channel QC$_{AB}$ and are also transmitted to the second communication station SB in the same way. It is necessary for the two stations SA and SB to be able to store the first secret keys KEK$_A$ and KEK$_B$ distributed by QVK via the satellite Sat.

In the method of FIG. 5B, steps B to D of the method of the invention are carried out by the first communication station SA, to generate a first encrypted secret key KC$_A$. This key KC$_A$ is generated from the first secret key KEK$_A$ and from a second secure secret key A, denoted KS$_A$. This step therefore consists of: KC$_A$=KEK$_A$⊕KS$_A$. This key KS$_A$ is generated by the first communication station SA via the true random number generator and is transmitted to the second communication station SB.

The method further comprises additional steps D'E, F', G' and H carried out by the first communication station SA, step D'E consisting in:

receiving a second encrypted secret key KC$_B$ generated by the second communication station from the first secret key KEK$_B$ and from a second secure secret key B, denoted KS$_B$, generated by the second communication station SB, i.e. KC$_B$=KEK$_B$⊕KS$_B$, and decrypting the second encrypted secret key KC$_B$ with the first secret key KEK$_B$ so as to obtain the second secure secret key KS$_B$, i.e. KEK$_B$⊕KC$_B$=KEK$_B$⊕KEK$_B$⊕KS$_B$=KS$_B$.

Step F' consists in generating a secret key K$_{AB}$ called the common secret key, by means of the one-time-pad technique, from the second secure secret key KS$_A$ and from the second secure secret key KS$_B$. Stated otherwise K$_{AB}$=KS$_A$⊕KS$_B$. To do this, steps B to D and step D'E must have ended before step F' is carried out. It is therefore necessary for the stations SA and SB to be able to synchronize to establish the second secure keys KS$_A$ and KS$_B$, respectively, so that steps B to D and D'E can be carried out before step F'.

Step G' of the method in FIG. 5B consists in:

distributing a secret key KL$_A$ called the first local secret key to the first local communication station SLA, over a first local quantum channel CLA. This channel CLA is a simple QKD quantum channel linking the station SA and the station SLA via an optical fiber. Thus, the distance between these stations SA and SLA is less than 100 km;

generating, by means of the one-time-pad method, a first encrypted local secret key KLC$_A$ from the first local secret key KL$_A$ and from the common secret key K$_{AB}$, i.e. KLC$_A$=KL$_A$⊕K$_{AB}$; and transmitting the first encrypted local secret key KLC$_A$ to the first local communication station SLA.

Step H of the method of FIG. 5B consists in decrypting, in the first local communication station SLA, the first encrypted local secret key KLC$_A$ using the first local secret key KL$_A$, so as to obtain the common secret key K$_{AB}$. This step therefore consists in the following: KLC$_A$⊕KL$_A$=KL$_A$⊕K$_{AB}$⊕KL$_A$=K$_{AB}$.

Just like the method of FIG. 3B, the various steps of the method of FIG. 5B are implemented by the assembly SA+SLA and are therefore "localized" in the same geographical area, instead of being distributed over various stations spaced apart by several hundred or thousand kilometers.

At the end of the method of FIG. 5B, and provided that certain steps are implemented by the stations SB and SLB (see method in FIG. 5C), the users UA and UB will possess a common secret key K$_{AB}$ known only to them and that they may use to secure their communications. Here, this operation can be reiterated with the same pair of KEK$_A$ and KEK$_B$ as many times as UA and UB need to communicate but also for any other user of the system. Specifically, the users UA and UB have no way of determining the pair of first secret keys KEK$_A$ and KEK$_B$ that are used by the stations SA and SB to establish other common secret keys for other users.

This pair of first secret keys $KEK_A$ and $KEK_B$ therefore remains secure and confidential.

The advantage of the method of FIG. 5B will become clearer from the description of FIG. 5C below. FIG. 5C illustrates one preferred embodiment of the method of FIG. 5B. This method is implemented by the system 2 of FIG. 5A and not only by the assembly SA+SLA, just like the method of FIG. 5B.

In the method of FIG. 5C, step D'E further comprises decrypting, in the second communication station SB, the first encrypted secret key $KC_A$ with the first secret key $KEK_A$ so as to obtain said second secure secret key A $KS_A$. This step therefore consists of: $KC_A \oplus KEK_A = KS_A \oplus KEK_A \oplus KEK_A = KS_A$.

Step F' of the method of FIG. 5C comprises generating, in the second communication station SB, the common secret key $K_{AB}$, by means of the one-time-pad technique, from the second secure secret key $KS_A$ and from the second secure secret key B $KS_B$.

In the method in FIG. 5C, step G' further comprises:

i. distributing a second local secret key $KL_B$ to a second local communication station SLB via a second local quantum channel CLB. Just like the first local quantum channel CLA, CLB is a QKD quantum channel linking the station SB and the station SLB via an optical fiber. Thus, the distance between these stations SB and SLB is less than 100 km;

ii. generating, by means of the one-time-pad method, a second encrypted local secret key $KLC_B$ from the second local secret key $KL_B$ and from the common secret key $K_{AB}$; and iii. transmitting said second encrypted local secret key $KLC_B$ to the second local communication station SLB.

Lastly, step H of the method of FIG. 5C comprises decrypting, in the second local communication station SLB, the second encrypted local secret key $KLC_B$ using the second local secret key $KL_B$, so as to obtain said common secret key $K_{AB}$. In the case where the keys are encoded in binary, this step consists in: $KLC_B \oplus KL_B = KL_B \oplus K_{AB} \oplus KL_A = K_{AB}$.

As explained above, at the end of the method of FIG. 5C, the users UA and UB of the local communication stations SLA and SLB will possess a common secret key $K_{AB}$ known only to them and that they may use to secure their communications. Critically, the operators UA and UB have no way of determining the pair of first secret keys $KEK_A$ and $KEK_B$ delivered by the stations SA and SB and used to generate the common secret keys for other users. Thus, the pair of keys $KEK_A$ and $KEK_B$ may be used for all users, and as many times as desired by these users, without compromising the security of the generated common secret key. This result is demonstrated below.

Consider all the information that the users UA and UB of the stations SLA and SLB and Eve are able to obtain. There is $KC_A = KS_A \oplus KEK_A$, $KC_B = KS_B \oplus KEK_B$. In addition, there are $KLC_A = K_{AB} \oplus KL_A = KS_A \oplus KS_B \oplus KL_A$ and $KLC_B = K_{AB} \oplus KL_B = KS_A \oplus KS_B \oplus KL_B$. Lastly, there is $K_{AB} = K_A \oplus K_B$, which represents the "final" common secret key that is unknown to Eve, and which is known only to UA and UB.

Eve can attempt the following actions: $KC_A \oplus KC_B = KS_A \oplus KEK_A \oplus KS_B \oplus KEK_B$. However, none of the terms simplifies and no information can be extracted.

Eve may attempt the combination $KC_A \oplus KLC_A = KS_A \oplus KEK_A \oplus KS_A \oplus KS_B \oplus KL_A = KEK_A \oplus KS_B \oplus KL_A$. Eve then obtains an XOR between a plurality of random secret sequences that does not allow useful information to be extracted therefrom.

Likewise, Eve may attempt the combination $KLC_A \oplus KLC_B = K_{AB} \oplus KL_A \oplus K_{AB} \oplus KL_B = KL_A \oplus KL_B$. Once again Eve obtains an XOR between two random secret keys from which nothing can be extracted.

In addition to the previous combinations that Eve may attempt, UA and UB may attempt other combinations because they possess the common secret key $K_{AB}$.

UA and UB may therefore attempt the following combination $KC_A \oplus K_{AB} = KS_A \oplus KEK_A \oplus K_{AB} = KS_A \oplus KEK_A \oplus KS_A \oplus KS_B = KEK_A \oplus KS_B$. They may also attempt: $KC_B \oplus K_{AB} = KS_B \oplus KEK_B \oplus K_{AB} = KEK_B \oplus KS_A$. Once again the result is an XOR between two random secret sequences that does not allow UA (or UB) to determine either of the first secret keys $KEK_A$ and $KEK_B$ stored by the stations SA and SB or even to determine the second secure secret keys $KS_B$ and $KS_B$.

In the method of FIG. 5C, station SA needs only two first secret keys $KEK_A$, $KEK_B$ distributed by QKD in common with station SB to be able, at any time, to establish a common secret key that may be distributed to the users who require it. Satellites no longer need to establish large amounts of secret keys in advance. The common secret keys can be produced very rapidly on demand by the stations SA and SB, this making it possible to increase the number of users on the ground and therefore the overall availability of the system 2.

Figure 6A:
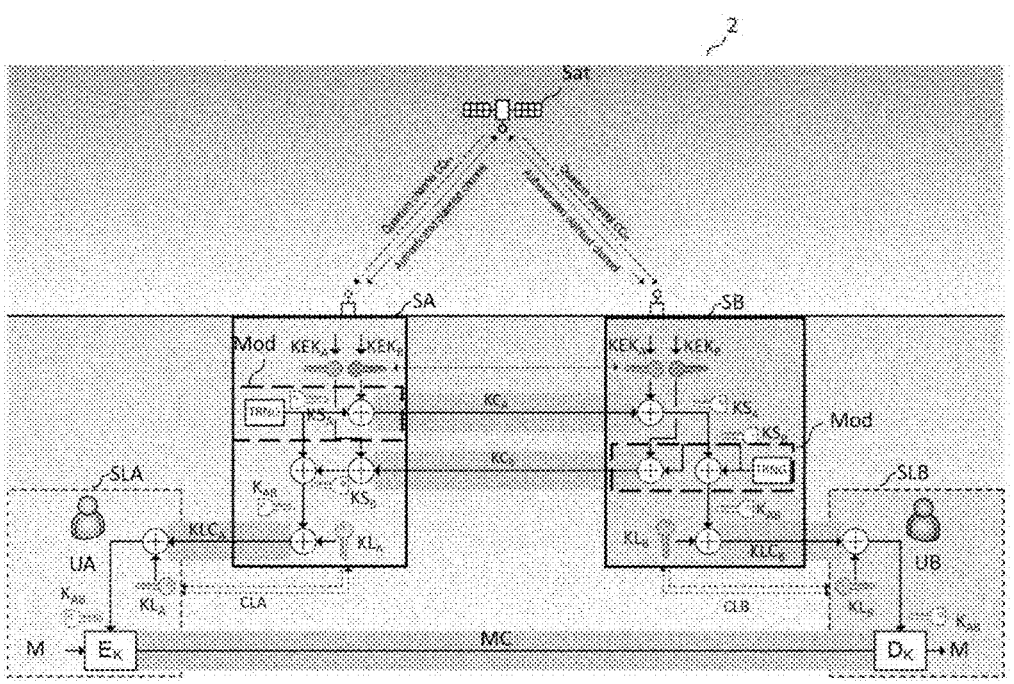
Figure 6B:
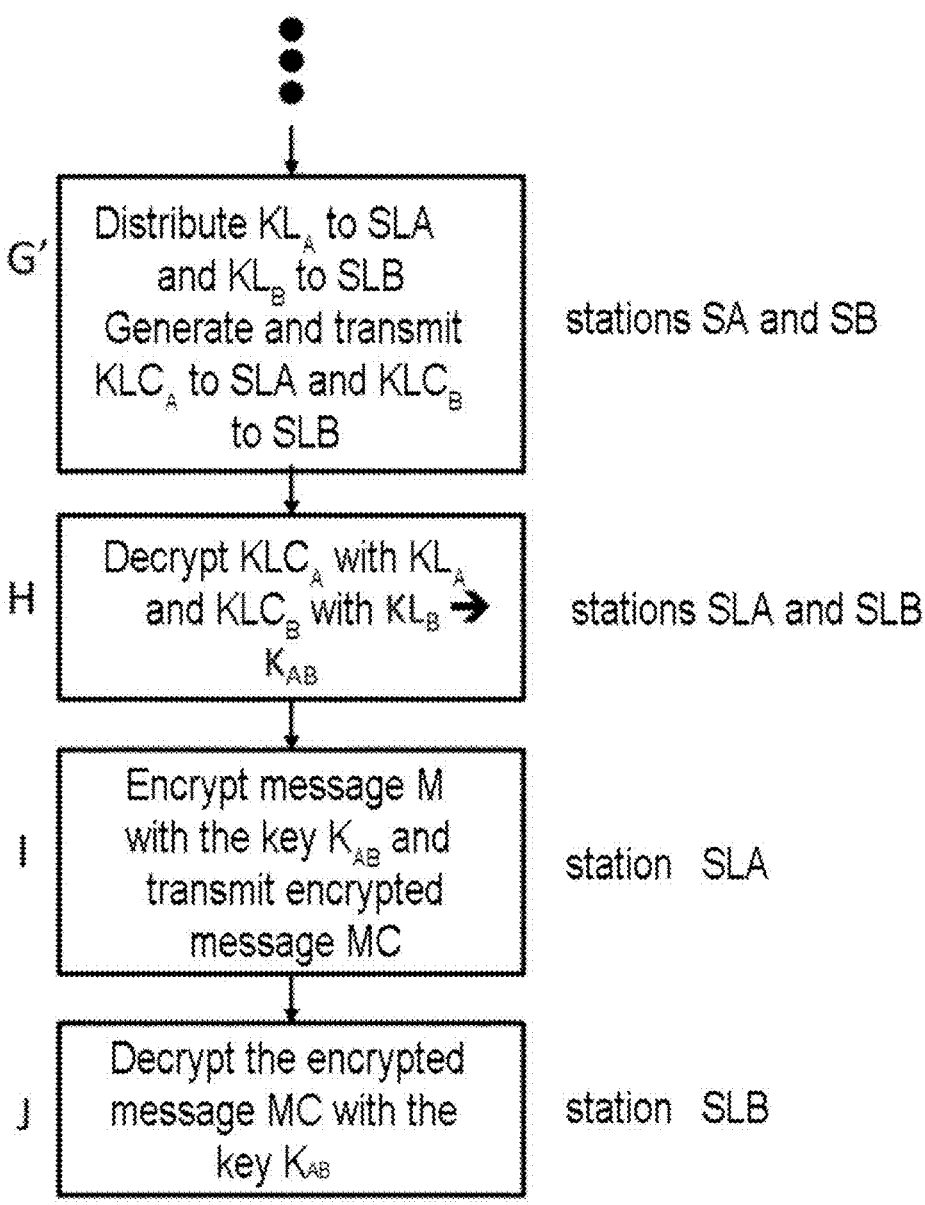

FIG. 6A illustrates one embodiment of the system 2 of the invention, configured to implement the method of FIG. 6B. This method is one preferred embodiment of the method of FIG. 5C. The method of FIG. 6B comprises a step I, subsequent to step H, and performed by the first local communication station SLA, of encrypting a non-random message M using said common secret key $K_{AB}$ then transmitting the encrypted non-random message MC to the second local communication station SLB. This message is preferably exchanged over the secure and authenticated channel $CS_{AB}$. The method of FIG. 6B comprises a step J, subsequent to step I, and performed by the second local communication station, of decrypting said encrypted non-random message using the common secret key $K_{AB}$.

The method of FIG. 6B is the ultimate goal of the method of FIG. 5C. It allows the stations SLA and SLB to exchange a plurality of non-random messages encrypted using a plurality of common secret keys $K_{AB}$, all generated locally by the stations SA and SB from a single pair of first secrets $KEK_A$, $KEK_B$.

Preferably, the first and second encrypted secret keys $KC_A$, $KC_B$ are transmitted over a secure and authenticated channel such as the channel $CS_{AB}$, using a message authentication code (MAC) computed on the basis of a common authentication key.

In one preferred embodiment of the system 1 or 2 of the invention, the communication stations SA and SB are on the ground and spaced apart by more than 100 km. Specifically, when the stations SA and SB are closer than this distance, a simple QKD channel linking the two stations via optical fiber is sufficient to exchange secure secret keys.

The invention claimed is:

1. A method for generating a secure secret key in stations of a communication system, the stations comprising one or more hardware processors, the method comprising the following steps:

A. receiving, in a communication station (SA) called a sending station, a first secret key (KEK) over a quantum encryption channel ($CQ_{AB}$) set up with a satellite (Sat), said first secret key also being transmitted to at least one other communication station (SB) via said quantum encryption channel;

B. generating, in said sending station, a second secret key (KS) using a true random number generator (TRNG);

C. generating an encrypted secret key (KC) from the first secret key (KEK) and second secret key (KS), by means of the one-time-pad method; and D. transmitting said encrypted secret key (KC) from the sending station (SA) to the one or more other communication stations (SB), wherein step A is repeated twice before step B, in order to receive, in a first communication station, a first secret key A ($KEK_A$) and a first secret key B ($KEK_B$) that is different from the first secret key A, the first secret keys A and B also being transmitted to a second communication station (SB), via said quantum channel, wherein steps B to D are carried out by the first communication station (SA) to generate a first encrypted secret key ($KC_A$) from the first secret key A ($KEK_A$) and from a second secure secret key A ($KS_A$) generated by the first communication station, and to transmit it to said second communication station (SB), said method comprising additional steps D'E, F', G' and H carried out by said first communication station, said step D'E consisting in:

receiving a second encrypted secret key ($KC_B$) generated by the second communication station from the first secret key B ($KEK_B$) and from a second secure secret key B ($KS_B$) generated by the second communication station, and decrypting said second encrypted secret key ($KC_B$) with the first secret key B ($KEK_B$) so as to obtain said second secure secret key B ($KS_B$), said step F' consisting in generating a secret key ($K_{AB}$) called the common secret key, by means of the one-time-pad technique, from the second secure secret key A ($KS_A$) and from the second secure secret key B ($KS_B$), said step G' consisting in:
i. distributing a secret key ($KL_A$) called the first local secret key to a first local communication station (SLA), via a first local quantum channel (CLA),
ii. generating, by means of the one-time-pad method, a first encrypted local secret key ($KLC_A$) from the first local secret key ($KL_A$) and from the common secret key ($K_{AB}$), and
iii. transmitting said first encrypted local secret key ($KLC_A$) to said first local communication station (SLA), said step H consisting in decrypting, in said first local communication station, said first encrypted local secret key ($KLC_A$) using the first local secret key ($KL_A$), so as to obtain said common secret key ($K_{AB}$).

2. The method as claimed in claim 1, comprising a step E, subsequent to step D, of decrypting, in the one or more other communication stations, said encrypted secret key (KC) using the first secret key (KEK), so as to obtain said second secret key (KS), which forms said secure secret key.

3. The method as claimed in claim 2, wherein the first secret key, the second secret key (KS) and the encrypted secret key (KC) are binary encoded, the encrypted secret key being generated via an XOR logic gate that combines the first secret key and second secret key, the encrypted secret key being decrypted via an XOR logic gate that combines the encrypted secret key and the first secret key.

4. The method as claimed in claim 2, wherein steps B to E are repeated a plurality of times, in order to form a plurality of secure secret keys ($KS_1$, $KS_2$, . . . , $KS_n$), all generated from the first secret key (KEK).

5. The method as claimed in claim 2, comprising a subsequent step F of encrypting a non-random message (M) using said or a said secure secret key then transmitting the encrypted non-random message (MC) from one communication station to another communication station, and comprising a subsequent step G of decrypting said encrypted non-random message using said secure secret key.

6. The method as claimed in claim 5, wherein the non-random message is encrypted by means of a symmetric encryption method that comprises block or stream encryption.

7. The method as claimed in claim 1, wherein step D'E comprises decrypting, in the second communication station (SB), said first encrypted secret key ($KC_A$) with the first secret key A ($KEK_A$) so as to obtain said second secure secret key A ($KS_A$), and wherein step F' comprises generating, in the second communication station, said common secret key ($K_{AB}$), by means of the one-time-pad technique, from the second secure secret key A ($KS_A$) and from the second secure secret key B ($KS_B$), said method comprising a step G', which comprises:
i. distributing a second local secret key ($KL_B$) to a second local communication station (SLB), via a second local quantum channel (CLB),
ii. generating, by means of the one-time-pad method, a second encrypted local secret key ($KLC_B$) from the second local secret key ($KL_B$) and from the common secret key ($K_{AB}$), and
iii. transmitting said second encrypted local secret key ($KLC_B$) to said second local communication station, and wherein said step H comprises decrypting, in the second local communication station, said second encrypted local secret key ($KLC_B$) using the second local secret key ($KL_B$), so as to obtain said common secret key ($K_{AB}$).

8. The method as claimed in claim 7, comprising a step I, subsequent to step H, and performed by the first local communication station, of encrypting a non-random message (M) using said common secret key ($K_{AB}$) then transmitting the encrypted non-random message (MC) to the second local communication station, said method comprising a step J, subsequent to step I, and performed by the second local communication station, of decrypting said encrypted non-random message using said common secret key ($K_{AB}$).

9. The method as claimed in claim 1, wherein the first secret key and the second secret key are of the same size.

10. An assembly (SA+SLA) for generating a secure secret key, said assembly comprising:

a communication station (SA) configured and/or operable to be implemented as part of a system, the communication station (SA) implemented as a first communication station comprising one or more hardware processors, the first communication station, for generating a secure secret key, said first communication station being configured to receive a first secret key (KEK) over a quantum encryption channel ($CQ_{AB}$) set up with a satellite (Sat), said first secret key also being transmitted to at least one other communication station (SB) via said quantum encryption channel, said first communication station comprising an encrypting module (Mod) configured to:

generate a second secret key (KS) using a true random number generator (TRNG);

generate an encrypted secret key (KC) from the first secret key (KEK) and second secret key (KS) by means of the one-time-pad method; and transmit said encrypted secret key (KC) to said other communication stations (SB); and said assembly further comprising a first local communication station (SLA), said first communication station (SA) being configured to:

receive a first secret key A ($KEK_A$) and a first secret key B ($KEK_B$) that is different from the first secret key A via said quantum encryption channel, the first key and the second key also being transmitted to a second communication station (SB) via said quantum channel, generate a first encrypted secret key ($KC_A$) from the first secret key A ($KEK_A$) and from a second secure secret key A ($KS_A$) generated by the first communication station, and to transmit it to said second communication station (SB), receive a second encrypted secret key ($KC_B$) generated by the second communication station from the first secret key B ($KEK_B$) and from a second secure secret key B ($KS_B$) generated by the second communication station, and decrypt said second encrypted secret key ($KC_B$) with the first secret key B ($KEK_B$) so as to obtain said second secure secret key B ($KS_B$), generate a secret key ($K_{AB}$) called the common secret key, by means of the one-time-pad technique, from the second secure secret key A ($KS_A$) and from the second secure secret key B ($KS_B$), distribute a secret key ($KL_A$) called the first local secret key to said first local communication station (SLA), via a first local quantum channel (CLA), generate, by means of the one-time-pad method, a first encrypted local secret key ($KLC_A$) from the first local secret key ($KL_A$) and from the common secret key ($K_{AB}$), and transmit said first encrypted local secret key ($KLC_A$) to said first local communication station (SLA), and said first local communication station being configured to decrypt said first encrypted local secret key ($KLC_A$)

using the first local secret key ($KL_A$), so as to obtain said common secret key ($K_{AB}$).

11. A system for generating a secure secret key, comprising said first communication station (SA) as claimed in claim 10, and comprising said other communication stations (SB) and said satellite (Sat), said other communication stations (SB) being configured to decrypt said encrypted secret key (KC) using the first secret key (KEK), so as to obtain said second secret key (KS), which forms said secure secret key.

12. The system as claimed in claim 11, wherein the communication stations are on the ground and spaced apart by more than 100 km.

13. A system comprising the assembly (SA+SLA) according to claim 10, the satellite (Sat), a second local communication station (SLB), and comprising a second communication station (SB) comprising an encrypting module (Mod), the second communication station being configured to:

decrypt, in the second communication station (SB), said first encrypted secret key ($KC_A$) with the first secret key A ($KEK_A$) so as to obtain said second secure secret key A ($KS_A$), generate a secret key ($K_{AB}$) called the common secret key, by means of the one-time-pad technique, from the second secure secret key A ($KS_A$) and from the second secure secret key B ($KS_B$), generate, in the second communication station, said common secret key ($K_{AB}$), by means of the one-time-pad technique, from the second secure secret key A ($KS_A$) and from the second secure secret key B ($KS_B$), distribute a second local secret key ($KL_B$) to the second local communication station (SLB), via a second local quantum channel (CLB), generate, by means of the one-time-pad method, a second encrypted local secret key ($KLC_B$) from the second local secret key ($KL_B$) and from the common secret key ($K_{AB}$), and transmit said second encrypted local secret key ($KLC_B$) to said second local communication station, the second local communication station being configured to decrypt said second encrypted local secret key ($KLC_B$) using the second local secret key ($KL_B$), so as to obtain said common secret key ($K_{AB}$).

\* \* \* \* \*